Patented Feb. 1, 1938

2,106,982

UNITED STATES PATENT OFFICE 2,106,982

GALVANIZING FLUX

Raymond J. Kepfer, Lakewood, Ohio, assignor, by mesne assignments, to E. I. du Pont de Nemours & Company, Wilmington, Del., a corporation of Delaware No Drawing. Application November 14, 1934, Serial No. 752,942

7 Claims. (Cl. 91—70.2)

This invention relates to flux compositions and processes for hot dip galvanizing, and is particularly directed to prepared flux compositions and to processes wherein a polyhydric alcohol, such as glycerine, or the polyhydroxy compound triethanolamine, is used as a foaming agent.

In hot dip galvanizing, a bath of molten zinc is covered with a flux. As articles to be galvanized are lowered into the molten zinc bath, they, of course, first pass through the flux where they are cleaned and prepared for the reception of a metal coating.

It has heretofore been the practice to add a material such as glycerine or tallow to the flux on the molten bath, in order to produce a foam or froth. This foam serves to entrap vapors and gases, and to retard the rate of volatilization of the flux. In the course of a galvanizing operation, it has been necessary to replace such of the flux as has volatilized, and it has also been necessary to add foam producing material to maintain a foam blanket of the desired thickness and character.

A considerable loss of flux and of foam producing agent resulted from the fact that they were added separately, and at the judgment of the galvanizer. At times there was not enough of the foaming agent present to maintain a foam of proper consistency and thickness, with the result that an excessive amount of flux was lost by volatilization. At other times, and especially immediately following its addition, there was present an excess of poorly mixed foaming material, with the result that some of it was decomposed and charred by the high temperatures of the galvanizing pot. In addition to thus wasting foaming agent this decomposition and charring resulted in the formation of charred particles which interfere with the galvanizing operation.

It is an object of this invention to provide processes and compositions whereby an optimum foam thickness and consistency are easily maintained, and whereby there is a minimum loss of flux and foaming agent. A further object of my invention is to provide a prepared composition which may be conveniently and easily used. Other objects will appear hereinafter.

I accomplish the above objects by mixing together the proper amounts of a flux and a polyhydroxy compound. A galvanizer is thus enabled to add the flux and foaming agent conveniently and in the proportions required to obtain a desired height and consistency of foam. As a result, there is no excessive loss of flux by volatilization. Also, since the flux and foaming agent are intimately mixed and in proper proportions, there is no charring of foaming agent.

The prepared compositions of my invention are composed of a polyhydroxy compound selected from the group consisting of polyhydric alcohols and triethanolamine, and a chloride flux selected from the group consisting of zinc chloride, ammonium chloride, and zinc ammonium chloride.

While I may use polyhydric alcohols such as glycols, pinacol, etc., I prefer to use glycerine as it is inexpensive and very satisfactory.

While I usually employ from about five-tenths to one per cent of glycerine in my novel compositions, the amount may be widely varied according to the conditions of use. When the composition is to be used in a "basket-process", or in a process of similar type, it is desirable to use a thick, heavy foam, and about one per cent of glycerine is required. However, in the so-called "hook-process" in which an article is simply suspended from a hook, it is necessary to use a somewhat lighter and thinner foam as a thick foam would float the article off the hook. For this type of process the composition preferably contains about five-tenths of a per cent of glycerine.

Similar considerations are involved when other polyhydric alcohols are used, and, also, when triethanolamine is used. Triethanolamine is preferably used in amounts varying from about five-tenths to two per cent, but the amounts may be widely varied depending upon the conditions of use. Triethanolamine is a particularly valuable foaming agent, and my invention is directed to the use of this novel agent in galvanizing generally as well as in prepared compositions of the type above discussed.

As typical examples of prepared compositions according to my invention, I may give the following:

*Example 1.*—A good flux for general use was prepared by intimately mixing three-fourths of a per cent of glycerine with a zinc ammonium chloride flux (44% $ZnCl_2$ and 56% $NH_4Cl$). This composition was used by adding some of it directly to a galvanizing pot containing molten zinc. An excellent foam blanket was obtained which was easily maintained by adding more of the composition as needed.

*Example 2.*—A flux composition particularly adapted for use in a basket-type galvanizing process was prepared by intimately mixing one per cent of glycerine with a zinc ammonium chloride flux. The prepared composition, when added to a bath of molten zinc, produced a foam about eight inches thick. The foam lasted for more than thirty minutes. As the flux and foam became exhausted, more of the prepared composition was added as required.

*Example 3.*—A flux composition particularly adapted for use in a hook-type galvanizing process was prepared by intimately mixing one-half of a per cent of glycerine with a zinc ammonium chloride flux. With this prepared composition, a foam about seven inches thick was obtained. The foam lasted about twenty-five minutes, and then it was necessary to add more of the prepared composition. The foam was of a relatively thin consistency, and when articles suspended from hooks were lowered into the bath, they penetrated the foam without floating off the hooks.

The glycerine used in the above examples was of C. P. grade, but other grades have been successfully used. The partly refined glycerine known as saponification glycerine is low in cost and very satisfactory.

The glycerine can be mixed with the flux in any desired manner. For instance, the flux in divided form may be charged into a rotatable mixer, and the glycerine may be added by spraying it upon the flux which is being tumbled.

*Example 4.*—A flux was prepared by intimately mixing one per cent of triethanolamine with a zinc ammonium chloride flux. The prepared composition was used as a flux on molten zinc with excellent results. A froth five inches thick which lasted sixteen minutes was obtained.

Triethanolamine is particularly satisfactory as a foaming agent, and I may, if desired, use it in numerous other ways. I may, for instance, add triethanolamine and flux separately to the galvanizing pot.

The triethanolamine preferably used is of commercial grade. Commercial triethanolamine is a substantially pure product aside from the inclusion of minor amounts of diethanolamine and monoethanolamine.

While the invention, as above described, is particularly adapted to hot dip galvanizing, it may be applied to other hot dip processes. It may, for instance, be applied to processes of coating which use baths of molten tin, lead, or cadmium.

While I have disclosed certain specific compositions and processes, I do not intend to be limited thereby, the scope of my invention appearing from the following claims.

I claim:

1. A foaming agent for use in a galvanizing bath of molten metal, comprising triethanolamine.

2. As a new manufacture, a prepared foaming galvanizing flux composition for use on a galvanizing bath of molten metal, comprising a predetermined amount of triethanolamine and a predetermined amount of a chloride flux selected from the group consisting of zinc chloride, ammonium chloride, and zinc ammonium chloride.

3. As a new manufacture, a prepared foaming galvanizing flux composition for use on a galvanizing bath of molten metal, comprising about one-half to two per cent of triethanolamine and a chloride flux selected from the group consisting of zinc chloride, ammonium chloride, and zinc ammonium chloride.

4. In a process of hot dip coating of metal by immersion in a molten bath, the step comprising adding triethanolamine to the bath.

5. In a process of hot dip galvanizing wherein articles to be coated are immersed in a bath of molten zinc, the step comprising adding to the bath a predetermined amount of triethanolamine and a predetermined amount of a chloride flux selected from the group consisting of zinc chloride, ammonium chloride, and zinc ammonium chloride.

6. In a process of hot dip galvanizing wherein articles to be coated are immersed in a bath of molten zinc, the step comprising adding to the bath a prepared composition which comprises about one-half to two per cent of triethanolamine and a chloride flux selected from the group consisting of zinc chloride, ammonium chloride, and zinc ammonium chloride.

7. In a process of hot dip galvanizing wherein articles to be coated are immersed in a bath of molten zinc, the step comprising adding to the bath a prepared composition which comprises a predetermined amount of triethanolamine and a chloride flux selected from the group consisting of zinc chloride, ammonium chloride, and zinc ammonium chloride, and maintaining a desired foam thickness and character by adding more of the prepared composition as required.

RAYMOND J. KEPFER.